Dec. 15, 1964    R. SALTERI ETAL    3,161,010
PROCESS AND DEVICE FOR THE MANUFACTURE OF GLASS YARNS
Filed June 19, 1961

Renato Salteri
Erich Hesselbarth
Inventors

BESchlesinger
Attorney

United States Patent Office 3,161,010
Patented Dec. 15, 1964

3,161,010
PROCESS AND DEVICE FOR THE MANUFACTURE OF GLASS YARNS
Renato Salteri, Milan, and Erich Hesselbarth, Barlassina, Milan, Italy, assignors to Vitrofil S.p.A., Milan, Italy, a company of Italy
Filed June 19, 1961, Ser. No. 118,055
Claims priority, application Italy, June 24, 1960, Patent 636,642
7 Claims. (Cl. 57—34)

It is an object of the present invention to provide a process and device for preparing continuous glass threads.

Preferably said device is applied in the spinning of glass filaments from rods, where the glass filaments are generated each from a rod which is heated at its end until fusion. However the device might be employed with other methods of generating glass filaments such as are known in the art (for example, melt spinning from beads) and, therefore, the reference to the spinning from rods should not be considered as a limitation.

The process according to the invention is characterized in that a plurality of filaments of glass, generated at a certain distance from one another, are advanced by a portion of a rotating cylindrical surface, are subsequently taken away from said surface, are gradually guided toward one another while they continue advancing, are introduced tangentially into a cylindrical space together with a stream of air, in which space they advance while describing a helical cylindrical path, whereby they undergo a moderate torsion and, optionally, a lubricating finishing or sizing operation, and are then collected, in the shape of moderately twisted thread, in any preferred way.

The device as illustrated comprises a generally cylindrical shell containing a rotary drum or analogous device for peripherally engaging a plurality of parallel, glass filaments and driving them forward in the space between said drum and said shell by means of the stream of air generated by the drum in its rotation, a stationary guide for engaging said filaments and separating them from the surface of the drum, a tapering conduit positioned to receive into one end thereof the filaments after they have been separated from the surface of the drum and having a decreasing cross-sectional area for gradually causing the filaments to approach one another as they travel within said conduit thereby to form said filaments into a bundle, a tubular cylindrical conduit which is positioned at the opposite end of said tapering conduit, and which is arranged at an angle with respect to the direction of movement of the bundle of filaments leaving said tapering conduit so that the bundle of filaments enters tangentially into said tubular cylindrical conduit and is driven forwardly by the stream of air generated by the rotating drum so as to travel in a helical path within the cylindrical conduit thereby acquiring a moderate twist, and means at the output end of said cylindrical conduit for collecting the yarn that is produced.

The device is used in combination with means of any kind to produce glass filaments and other means of any kind to collect the moderately twisted yarn that issues from the above mentioned cylindrical conduit.

The invention will be more fully understood from the description of a preferred embodiment shown in the accompanying drawings, wherein.

Figure 1:
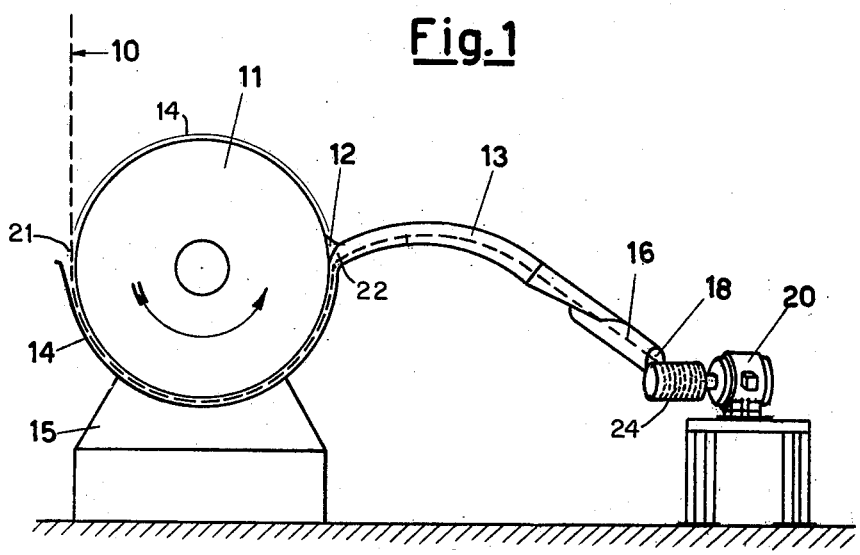
FIG. 1 is a diagrammatic end view of this embodiment.

With reference now to the drawing, 10 represents a plurality of glass filaments, preferably produced by an equal number of rods, not shown, the ends of which are melted by heating means, for instance suitable flames, or by any other conventional means. Those filaments descend downwards by gravity and their free ends are gripped by the cylinder or drum 11 and they are advanced by the stream of air generated by the rotation of said cylinder, which is mounted on the base 15, and which rotates in the direction of the arrow in FIG. 1. The cylinder or drum 11 is completely enclosed in a shell or casing 14 which is provided at substantially diametrally opposite points thereon with a longitudinally extending inlet slot 21 and a longitudinally extending outlet slot 22, both of which are tangentially arranged with respect to the drum. Since the filaments travel in the space between the cylinder or drum 11 and the lower, semi-circular part of the shell 14, they are in somewhat the same condition as if they were enclosed in a conduit, and therefore they follow the stream of air flowing in said space in the direction of rotation of the drum. The filaments, after entering inlet slot 21, describe a path of about 180° in the temperature between the lower surface of said cylinder and the lower portion of shell 14, whereafter a knife or stationary guide 12, which is in the form of a wedge positioned tangentially with respect to the drum 11 along the upper edge of slot 22, separates them from the surface of the cylinder and directs them into the conduit 13 which is connected to the shell over the outlet slot 22.

Figure 2:
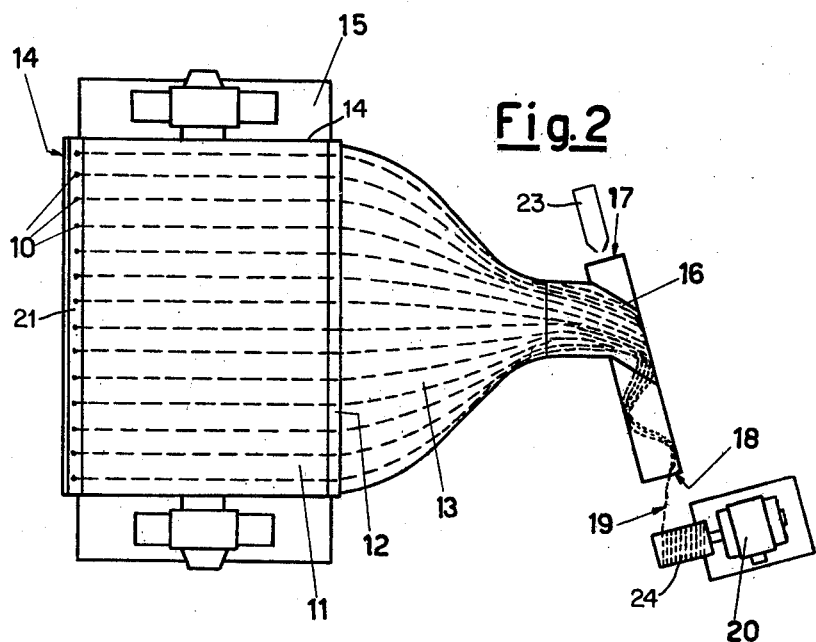
FIG. 2 is a diagrammatic plan view thereof.

Here the filaments are pushed along the conduit 13 by the stream of air generated by the rotation of the cylinder. As shown in FIG. 2, the conduit 13 is tapered towards its outer end remote from drum 11, so that the stream of air, and with it the glass filaments, are deviated and the latter are guided toward one another while keeping approximately parallel to form a bundle of filaments at the outlet. The bundle of filaments enters tangentially into an opening in a cylindrical conduit 16, which is connected to the output end of the conduit 13, at an angle to the axis of conduit 16, that is, tangentially of this conduit. The conduit 16 is open at its two ends, and its axis is inclined preferably by 30°–60° with respect to the axis of the conduit 13. Hence it is clear that as the bundle of filaments advances along the cylindrical conduit 16, from the end 17 to the end 18 thereof, it is formed into a cylindrical helix, the pitch thereof depending on the angle that the cylindrical conduit 16 forms with the axis of the conduit 13. While describing this helical path, the bundle of filaments undergoes a moderate twist, which renders the bundle more coherent and forms it into a single multi-filament strand that leaves the mouth 18 of the conduit 16 in the shape of a thread 19 moderately twisted, which, therefore, can be wound up on a spooling device or the like 24 which is driven by motor 20 and which is diagrammatically indicated in the drawing. The magnitude of the twist depends on the length of the cylindrical element 16. Preferably this length is at least one metre, but may be greater. From the end 17 of the cylindrical conduit 16 it is possible to introduce a lubricating finish or sizing agent, preferably in the nebulized state, by means of a spray nozzle 23 which is positioned to direct the agent into the open end 17 of the cylinder and onto the filament therein.

As is apparent, the particular shape and disposition of the elements constituting the device may be varied by the skilled in the art without departing from the scope of the present invention.

It has been found that surprisingly the glass filaments, which are notoriously extremely fragile, group together without breaking in the conduits 13 and 16, whereafter they cooperate with one another and this cooperation protects them against subsequent breakage until they form, as stated, a multifilament thread moderately twisted. In that way it is possible to obtain continuous multifilament threads by the rod-spinning process, which not industrially possible heretofore because it was not possible to avoid breakage of the individual glass filaments. Of course the device may be employed for the spinning of materials other than glass, in particular of mineral materials such as rock wool.

What is claimed is:

1. A process for the preparation of continuous multifilament glass yarns, comprising the steps of
   (a) forming a plurality of parallel glass filaments,
   (b) causing said filaments to advance over a portion of a cylindrical surface,
   (c) thereafter separating the advancing filaments from said surface and causing them to converge toward one another while continuing to advance thereby to form a bundle of parallel filaments,
   (d) directing said bundle of filaments tangentially into a space bounded by a cylindrical surface,
   (e) causing said bundle to advance in said space against the last-named cylindrical surface in a substantially helical path about the axis of said cylindrical surface while said filaments close together to form a helical bundle of filaments, and
   (f) collecting said helical bundle of filaments by winding the same about a spooling device which rotates about an axis transverse to the axis of said cylindrical surface, thereby to draw about said spooling device a moderately twisted multifilamentary yarn.

2. A process as defined in claim 1 including the step of applying a lubricating finishing agent to said bundle as it enters said last-named space and during the passage of said bundle along its helical path through said space.

3. A process as defined in claim 1 including the step of employing a stream of air to advance said filaments into and through said space.

4. A process for the preparation of continuous multifilament glass yarns, comprising the steps of
   (a) continuously forming a plurality of spaced, parallel glass filaments,
   (b) directing said filaments into engagement with a rotating cylindrical surface at axially spaced points therealong for rotation therewith,
   (c) separating the filaments progressively from said surface after a partial revolution about the axis of rotation of said surface,
   (d) thereafter causing the filaments to converge toward one another to form a bundle,
   (e) directing the bundle tangentially into a tube, and
   (f) causing said bundle of filaments to advance axially through said tube against the inside surface thereof in a substantially helical path about the axis of said cylindrical surface while the filaments close together to form a helical bundle of filaments, and
   (g) collecting said helical bundle of filaments by winding the same about a spooling device which rotates about an axis transverse to the axis of said cylindrical surface, thereby to draw about said spooling device a moderately twisted multifilamentary yarn.

5. Apparatus for manufacturing multifilament glass or the like inorganic yarns, comprising
   (a) a shell,
   (b) a rotary drum mounted within said shell coaxially thereof and radially spaced therefrom for peripherally engaging a plurality of parallel filaments, to advance said filaments in the space between said drum and said shell by means of a stream of air which is created upon the rotation of said drum relative to said shell,
   (c) a stationary guide juxtaposed to said drum to separate said filaments from the peripheral surface of said drum after advance of said filaments a predetermined distance in said space about the axis of said drum,
   (d) a tapering conduit communicating adjacent one end thereof with the space between said drum and said shell to receive said filaments upon separation thereof from said drum, and having decreasing cross-sectional area from said one end to its opposite end thereby to crowd said filaments more closely together so that they form a bundle as they pass through said conduit, and
   (e) an elongate, tubular cylindrical conduit communicating adjacent one end thereof with said opposite end of said conduit, and arranged so that its axis is disposed at an angle to the direction of movement of the filaments in said tapering conduit, so that the bundle of filaments enters said cylindrical conduit tangentially, and advances in a helical path through said cylindrical conduit about the axis of said cylindrical conduit, and
   (f) spooling means for collecting the helical bundle of filaments as it passes out of said cylindrical conduit, said spooling means being supported and driven for rotation about an axis transverse to the axis of said cylindrical conduit for imparting to said bundle a moderate twist by winding said bundle about an axis different from the axis of said helical path,
   (g) the stream of air generated by the rotation of said drum passing through said conduits and advancing the filaments and bundle through said conduits.

6. Apparatus as defined in claim 5 wherein the axis of said cylindrical conduit is inclined at 30° to 60° with respect to the axis of said tapering conduit.

7. Apparatus for preparing multifilament yarn, comprising
   (a) a hollow, tapering conduit having a reduced cross sectional area at one end thereof,
   (b) means for feeding a plurality of spaced, parallel filaments into the opposite end of said conduit and longitudinally thereof so that said filaments are bunched together into a bundle as they approach said one end,
   (c) a tubular cylindrical conduit connected adjacent one end thereof to said one end of said tapering conduit and having its axis disposed at an angle to the axis of said tapering conduit,
   (d) said conduits being so disposed relative to one another that said tapering conduit directs said bundle tangentially into engagement with the inside wall of said cylindrical conduit, whereby said inside wall guides said bundle in a helical path about the axis of said cylindrical conduit toward the opposite end of said cylindrical conduit, thereby to form the filaments in said bundle into a multifilament helical bundle, and
   (e) spooling means adjacent said opposite end of said cylindrical conduit for collecting the helical bundle of filaments as it passes out of said cylindrical conduit, said spooling means being supported and driven for rotation about an axis transverse to the axis of said cylindrical conduit for imparting to said helical bundle a moderate twist by winding said helical bundle about an axis different from the angle of said helical path,
   (f) said feeding means including means for directing a stream of air into said opposite end of said tapering conduit to convey the filaments through said conduits.

References Cited by the Examiner

UNITED STATES PATENTS

| 2,786,637 | 3/57 | Russell et al. | 28—21 |
| 2,976,580 | 3/61 | Riedel | 57—140 |

FOREIGN PATENTS

| 326,452 | 2/19 | Germany. |

MERVIN STEIN, *Primary Examiner.*

RUSSELL C. MADER, *Examiner.*